United States Patent [19]

Nitzke

[11] Patent Number: 4,915,441
[45] Date of Patent: Apr. 10, 1990

[54] WIND FAIRING AND MOUNT

[76] Inventor: Clyde Nitzke, 730 Robert, Poy Sippi, Wis. 54967

[21] Appl. No.: 393,799

[22] Filed: Aug. 15, 1989

Related U.S. Application Data

[63] Continuation of Ser. No. 219,378, Jul. 14, 1988, abandoned.

[51] Int. Cl.⁴ .............................................. B62D 35/00
[52] U.S. Cl. ................................ 295/180.2; 298/117; 180/89.17
[58] Field of Search .................. 296/180.1–180.5, 296/183, 185; 180/89.13, 89.14, 89.17, 89.18; 293/117

[56] References Cited

U.S. PATENT DOCUMENTS

| | | | |
|---|---|---|---|
| D. 163,279 | 5/1951 | Harris | D12/96 |
| 2,699,223 | 1/1955 | Brumbaugh | 180/89 |
| 2,769,501 | 11/1956 | Wagner | 180/69.2 |
| 3,217,354 | 11/1965 | May | 16/338 |
| 3,282,368 | 11/1966 | Pittera | 180/53.7 |
| 3,425,740 | 2/1969 | De Vaughn | 296/180.4 X |
| 3,762,758 | 10/1973 | Wilkerson | 296/180.2 |
| 3,792,889 | 2/1974 | Fuener | 293/115 |
| 3,844,369 | 10/1974 | Schroeder | 180/68.6 |
| 3,935,920 | 2/1976 | Shiel | 180/89.16 |
| 4,099,760 | 7/1978 | Mascotte et al. | 293/117 X |
| 4,109,485 | 8/1978 | Grosskopf | 180/89.14 X |
| 4,131,309 | 12/1978 | Henke | 296/180.2 |
| 4,141,427 | 2/1979 | Kirchweger | 180/89.14 X |
| 4,313,635 | 2/1982 | Front | 296/180.3 |
| 4,314,786 | 7/1980 | Morrison | 296/180.2 |

FOREIGN PATENT DOCUMENTS 1593142  7/1981  United Kingdom .

OTHER PUBLICATIONS

Automotive News, Jan. 7, 1985, p. 22, "Modified Ford CLT 9000 'Sips' Fuel".
Peter Built C.O.E. Heavy Duty Trucks.
American Trucker, Nov. 1988, p. 6,10,12.
Peter Built Brochure, Model 372.

*Primary Examiner*—Dennis H. Pedder
*Attorney, Agent, or Firm*—Russell L. Johnson

[57] ABSTRACT

A wind fairing and mount wherein the wind fairing has attached to it an upper latching assembly and a lower pivot assembly and the latching and pivoting relationship between the assemblies is established and maintained relative to the fairing. The pivot assembly is attachable to the bumper mounts of a truck. The mount permits positional adjustment of the fairing relative to the truck along and about three axes at right angles to each other.

13 Claims, 4 Drawing Sheets

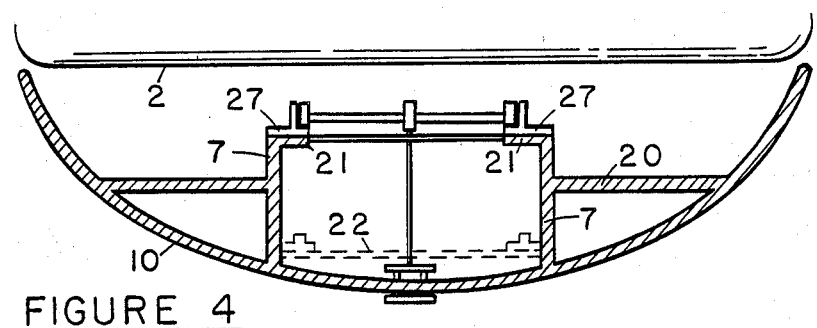
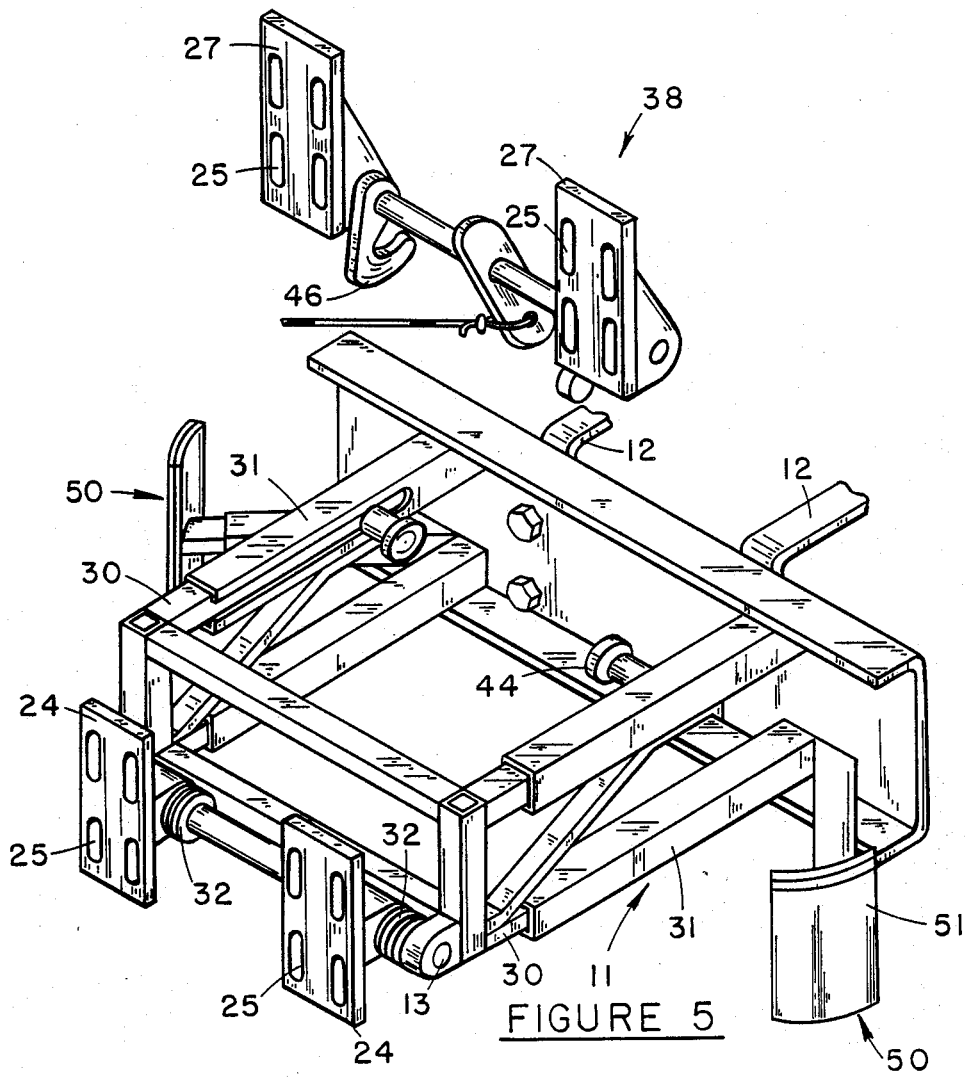

WIND FAIRING AND MOUNT

This is a continuation of application Ser. No. 219,378, filed 07/14/88, abandoned.

FIELD OF THE INVENTION

This invention relates to wind fairings for the fronts of trucks.

More particularly this invention relates to a tilting means for mounting wind fairings to the fronts of cab over engine tractors for large trucks.

Still more particularly this invention relates to the means for mounting wind fairings described above wherein the mounting means is retrofitable to a large percentage of existing truck units as well as new vehicles.

BACKGROUND OF THE INVENTION

Fuel economy for large trucks is a meaningful factor in profitable trucking. The air drag on trucks is a significant factor in the fuel economy of trucks. Wind fairings on the tops and sides of truck cabs are common sights on the nation's highways.

Few, if any, wind fairings for the blunt fronts of cab over engine trucks are seen on the highways. It would seem that a fairing to smooth the flow of air around the front of the truck would be highly desirable. However, the art has not provided such a wind fairing that is now in general use.

Providing a fairing to smooth the flow of air past the front of trucks presents a number of problems.

First, the air flow must pass through the fairing to the truck's cooling system as well as pass along the sides and over and under the fairing.

Second, the fairing must be readily tiltable to permit the tilting of the truck's cab to gain access to the truck's engine.

Third, the fairing must be provided with functionally effective bumper, headlights, directional signals, and the like.

Fourth, the fairing and mount must serve a large range of truck makes and models.

Fifth, the fairing must provide safety, must not be noisy, and must be aesthetically acceptable to truckers.

A fairing mount that meets the above requirements has not heretofore been achievable, practically and economically.

OBJECTS

It is therefore an object of this invention to provide a wind fairing and mount wherein the mount permits the tilting of the fairing to permit access to the truck engine.

It is further an object of this invention to provide the fairing and mount described above wherein a lower pivot assembly and an upper latching assembly are secured to the fairing and the relationship between the pivot assembly and the latching assembly are established and maintained relative to the fairing.

It is further an object of this invention to provide the fairing and mount as described above wherein a bumper assembly is secureable to the bumper mounts of a truck and to which the pivot assembly is secureable.

It is further an object of this invention to provide the fairing and mount described above wherein the fairing is provided with ducting to guide air to the trucks cooling system, and the fairing is further provided with, headlights, directional signals, a bumper and the like to provide the necessary functional and safety needs ordinarily provided at the fronts of trucks.

Other objects will become apparent from the following descriptions, drawings, and claims.

BRIEF DISCUSSION OF THE PRIOR ART

The prior art abounds with wind fairings and mounts for trucks.

The most relevant patent art known to the inventor is;

U.S. Pat. No. 4,313,635 to FRONT teaches a tiltable wind fairing hinged at the top and having headlights mounted in the fairing.

U.S. Pat. No. 3,425,740 to VAUGHN teaches hinged fairings for the top, sides and backs of trailers.

British Patent No. 1,593,142 to BROADBENT teaches a skirt for deflecting air under a vehicle.

U.S. Pat. No. 3,762,758 to WILDERSON teaches a tiltable wind fairing for the front of vehicles which have a bumper.

The most relevant, non-patent, prior art known to the inventor is found in the trade literature;

*Automotive News*, Modified Ford CLT 9000 'sips' Fuel, Jan. 7, 1985, page 22; wherein a wind fairing similar in geometry to the wind fairing contemplated by this invention is shown.

The prior art does not provide a bottom tilting mount for wind fairings for the fronts of trucks of the type provided by this invention.

BRIEF DESCRIPTION OF THE INVENTION

The invention in its simplest form comprises a wind fairing, a bottom pivot assembly secured to the wind fairing, a top latch assembly secured to the wind fairing and the pivoting and latching relationship between the pivot assembly and the latch assembly are established relative to the fairing, and a bumper mounting assembly which is secureable to the bumper mounts of a truck and which is engageable with the pivot assembly to position the fairing relative to the front of the truck.

BRIEF DESCRIPTION OF THE DRAWINGS

FIG. 4 is a sectioned top plan view of the fairing of FIG. 3

FIG. 5 is a partially schematic pictorial view of a preferred embodiment of the fairing mount of this invention.

DETAILED DESCRIPTION

Figures 1, 2, 3:
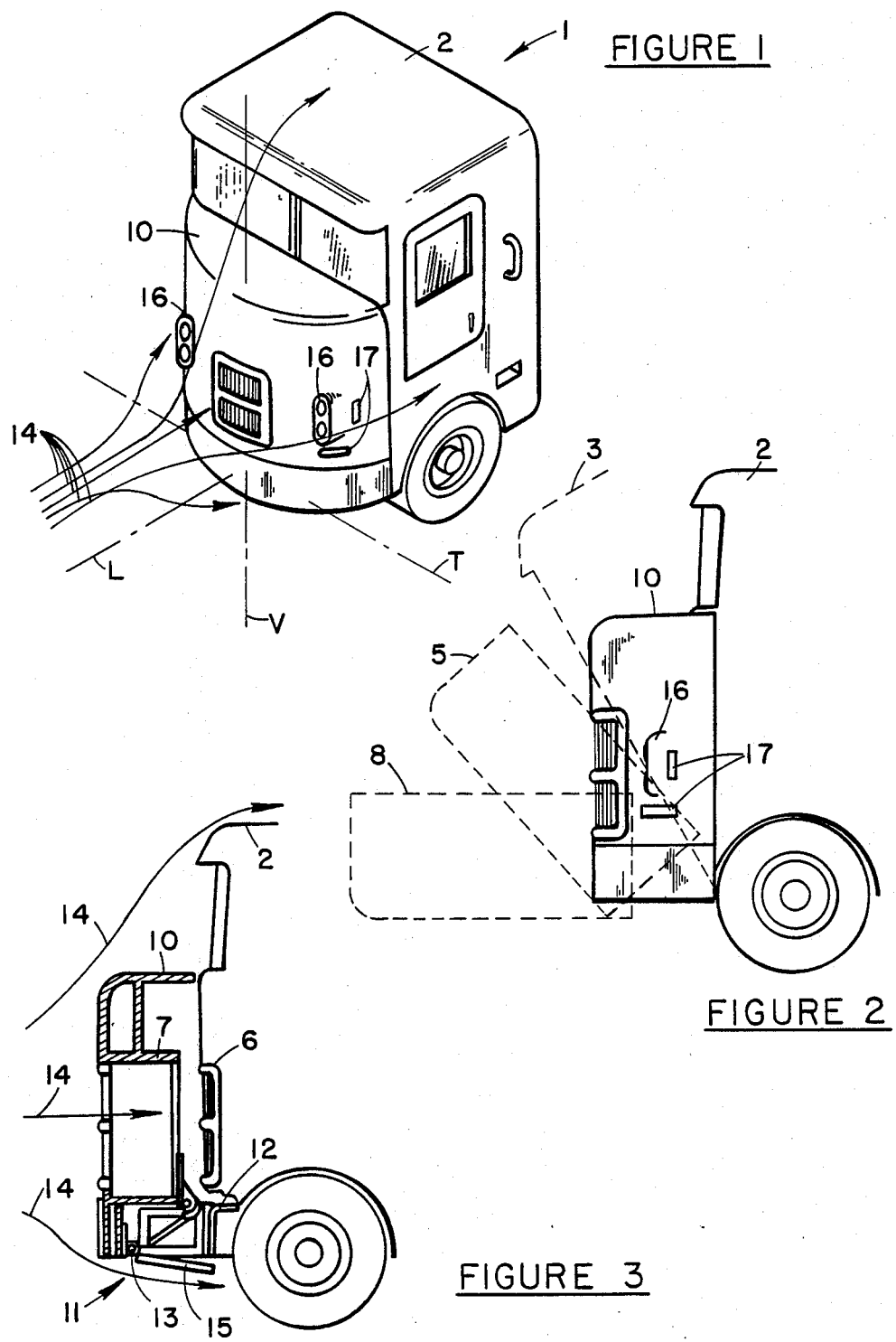
FIG. 1 is a pictorial view of the wind fairing of this invention showing air flow relative to the fairing.
FIG. 2 is a side elevational view of the fairing of this invention showing the tilting relationship between the fairing and a truck cab.
FIG. 3 is a side elevation partially sectioned view of the fairing of this invention showing air paths relative to fairing and truck structures.

The problems to be dealt with in order to achieve a practical wind fairing and mount for the fronts of large trucks are numerous and vexatious. FIGS. 1, 2 and 3 will serve to illustrate a wind fairing and mount of this invention and to point out the problems that are satisfactorily dealt with by this invention.

Cab over engine rigs such as truck 1 are constructed so that cab 2 tilts forward to tilt position 3, (shown dashed) for servicing the engine. It would not be practical to remove a wind fairing each time cab 2 needs to be tilted to gain access to the truck's engine. The truck bumper is secured to the frame. A wind fairing fixed to the front of truck 1 would ordinarily engage the ground or the bumper and prevent the tilting of cab 2.

The wind fairing 10 of this invention is mounted to a mounting frame 11 which is secured to bumper mounts 12 and frame 11 supports pivot 13 which permits fairing 10 to axle to tilt position 5 (shown dashed) when cab 2 is pivoted to tilt position 3 or fairing 10 may be lowered to tilt position 8 for occasions when cab 2 needs to be tilted to the horizontal position.

A practical wind fairing guides the flow of air as illustrated by wind flow arrows 14 in FIG. 1 and 3. Air is directed along the sides and over the cab of truck 1. Air must also be guided to radiator grill 6 of truck 1. Duct 7 in wind fairing 10 serves this end without creating air pressure inside wind fairing 10 that might otherwise cause wind fairing 10 to buffet and vibrate. For similar reasons, mounting frame 11 is provided with a bottom wind deflector 15.

After the needs of tilting and airflow are met, a practical wind fairing must provide for head lights, directional signals and the like. To adopt the fairing to use the lights on truck 1 would limit the visibility of the lights and become a safety hazard, and disrupt the air flow over the fairing. Wind fairing 10 of this invention is provided with headlights 16 and directional signals 17 which are electrically connected by conventional means to the headlights and directional signals, respectfully, of truck 1.

The mounting of headlights 16 to fairing 10 requires that fairing 10 be stable and vibration free when truck 1 is in operation and that fairing 10 be returned to a precise operating position after tilting to permit servicing the engine of truck 1. To serve this end, the contact points and surfaces of wind fairing 10 and mounting frame 11 are provided with rubber or synthetic materials as contact surfaces to prevent vibrations, squeaks, and rattles while insuring precise positioning and shock absorbency. These rubber cushioning contact surfaces are generally not illustrated or recited in the following descriptions and drawings but they are to be understood to be an important component of the wind fairing and mount of this invention.

The proper positioning of the wind fairing relative to cab 2 is critical to the appearance and function of wind fairing 10. In order to adjust wind fairing 10 to a proper fit with cab 2, a fairing mount should permit the adjustment of the wind fairing 10 relative to cab 2 in three modes of translation and three modes of rotation along and about three axes at right angles to each other. As shown in FIG. 1, these axes may be referred to as the longitudinal axis-L, the transverse axis-T, and the vertical axis-V. The movements along these axes may be referred to as front to back, side to side, and up and down respectfully. Wind fairing 10 also needs to be rotatable about all three axes in order to provide a means for accurate positioning of wind fairing 10 relative to cab 2. The fairing and fairing mount of this invention provides means for adjustment in all six modes of relative movement Once the desired fit is obtained, the proper positioning of the fairing needs to be maintained. The fairing mount of this invention provides securement means for reducing the relationships between wind fairing 10, mounting frame 11, and cab 2 to a fixed relationship. The term, "securement means", as used herein shall be understood to include reversible securement means such as pins, keys, and bolts, and/or, permanent securement means such as welds and rivets.

It should be noted that it is desirable to have the fairing mount elements rendered fixed once the proper positioning of the fairing and fairing mount are achieved. It also should be noted that it is within the scope of this invention to provide a fairing mount with the principle elements secured in fixed relationships. This is not preferred since any variance in the relevant truck structures or the fabrication of the fairing or mount will result in a variance in the fit between the fairing and the truck.

Figure 6:
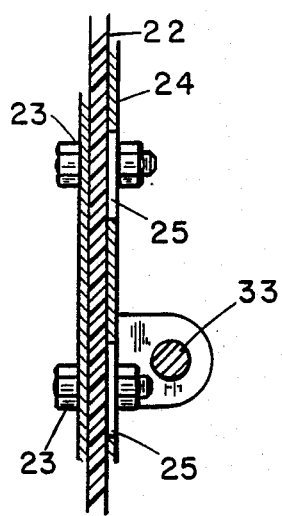
FIG. 6 is a sectional view of a preferred means for securing the fairing to mounts.

Referring now to FIGS. 4, 5 and 6. Fairing 10 is provided with reinforcing panel 20 and duct 7 which combine to render fairing 10 rigid. Duct 7 is provided with flanges 21 to which latch mounts 27 are secured. Fairing 10 is provided with reinforcing panel 22 (shown dashed) which is positioned below duct 7 and to which pivot mounts 24 are secured.

Figure 7:
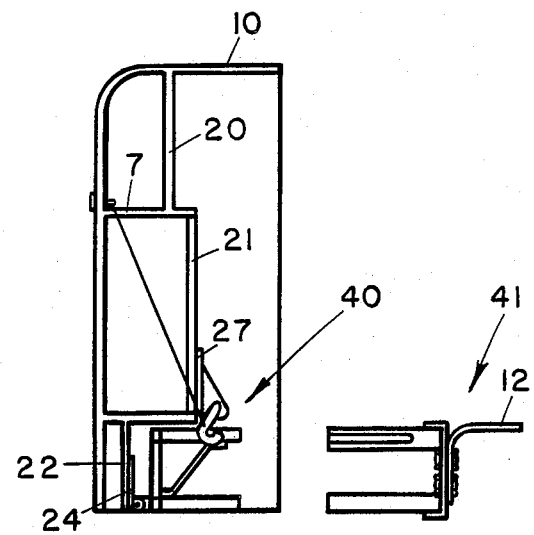
FIG. 7 is a sectioned elevational view of a fairing and mount made according to this invention showing the relationship between the principle elements of the fairing and mount.

Referring now to FIGS. 5 and 7 which show the relationship between upper latch assembly 38 and lower mounting frame 11. Frame 11 is made up of latch engaging and pivot unit 40 and bumper unit 41 as is shown in FIG. 7. Latch assembly 38 is provided with a latch means which may be one or more latch hooks 46. Latch engaging and pivot unit 40 is provided with a latch engaging means which may be one or more latch pins 44. Pin 44 is attached to a movable slide member 30 and movable slide member 30 is an elongate tubular member having a longitudinal axis. Fixed slide member 31 is an elongate tubular member having a longitudinal axis. Movable slide member 30 is insertable into fixed slide member 31 so that they bear a telescoping relationship with each other wherein their longitudinal axes are coincident so that fixed slide member 31 is coaxial with movable slide member 30. In a preferred embodiment shown in detail in FIG. 5, four telescoping pairs of fixed slide members 31 and movable slide members 30 are secureable to the front of a truck in a rectangular configuration as shown with the longitudinal axes of the slide members parallel to each other and parallel to the longitudinal axis-L of a truck.

As used herein, the term "operating position" shall be read to mean the configuration of the fairing and mount when mounted on a truck and the truck is operating on a highway. Positional terms such as upper, lower, top, bottom, inside, outside, front, back, and the like shall be understood to relate to positional relationships that are present when the fairing and mount are in the operating position.

Figure 8:
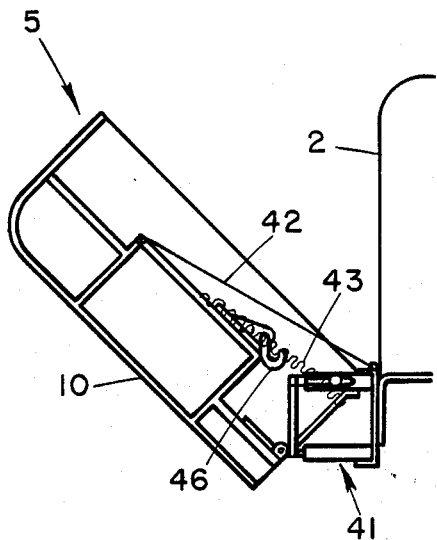
FIG. 8 is a sectioned elevational view showing a fairing and mount in the tilted position.

Referring now to FIGS. 5, 7, and 8 which show the positional relationships between upper latch assembly 38, lower latch engaging and pivot unit 40 and bumper unit 41. Upper latch assembly 38 is secured to fairing 10 by means of latch mounts 27 and lower latch engaging and pivot unit 40 is secured to fairing 10 by means of pivot mounts 24. When fairing 10 is in the operating position, latch means such as latch hook 46 is engaged with latch engaging means such as pin 44 to secure latch assembly 38 to latch engaging and pivot assembly 40 as shown in FIG. 7. With bumper unit 41 secured to bumper mounts 12 as shown in FIG. 7, latch engaging and pivot unit 40 is engageable with bumper unit 41 to position fairing 10 in the operating position as shown in FIG. 3. When the latch means is disengaged from the latch engaging means, fairing 10 may be tilted about axle 13 to permit access to cab 2 as shown in FIG. 8.

FIG. 6 shows pivot mount 24 secured to reinforcing panel 22 by means of bolts 23 which pass through reinforcing panel 22 and engage pivot mounts 24 through adjustment slots 25. Once the desired position is achieved for fairing 10, a pin or bolt my be passed through pivot mount 24 and reinforcing panel 22 to render them fixed relative to each other. In a like manner, once the position of fairing 10 relative to fairing mounting frame 11 is established, the relevant positioning adjustment means may be rendered fixed by such well known means as pinning, riveting, welding, threaded fasteners, and the like. Similarly, latch mounts 27 are joined to flanges 21 by bolts (not shown) passing through adjustment slots 25 in latch mounts 27.

Flanges 21 are parallel to reinforcing panel 20 and to the front of cab 2. Vertical adjustment along axis-V of fairing 10 relative to cab 2 can be achieved by loosening bolts 23 and rising or lowering fairing 10 relative to mounts 24 and 27.

Fairing 10 may be positionally adjusted relative to cab 2 along longitudinal axis-L by moving inner movable slide members 30 relative to outer fixed slide members 31.

Sideways positional adjustment of fairing 10 relative to cab 2 may be had by adding to or subtracting from the spacers 32 to either side of pivot mounts 24. Alternatively, axle 13 may be threaded and secured in place by means of locking nuts (not shown).

Adjustable seating guides 48 (see FIG. 9) which are associated with latch mounts 27 are adjusted to agree with such movements of fairing 10 along transverse axis-T.

Final positional adjustments of the relationship between fairing 10 and cab 2 may be had by rotating fairing 10 about axis-L, axis-T, and axis-V to a small degree. Rotation about the vertical axis-V can be had by moving the movable slide members 30 on one side of the vertical axis-V relative to the slide members 30 on the opposite side of vertical axis-V. Rotation about the longitudinal axis-L can be had by loosening bolts 23 and raising one side of fairing 10 relative to the other side of fairing 10. Rotation about the transverse axis-T can be had by by moving the upper movable slide members 30 relative to the lower movable slide members 30. The clearances, play, and flexure of the elements of fairing 10 and mounting frame 11 will permit sufficient movement in rotation about the three principle axes to achieve any ordinarily needed rotational adjustments.

Once the final positioning is achieved, the adjustment members are fixed relative to each other and the available clearances, play, and flexure between the members is reduced.

FIG. 7 serves to illustrate a highly desirable and novel combination of the features of this invention that greatly enhances the utility and practicality of the invention. The wind fairing and mount of this invention can be divided into three units for the purposes of discussion. First; is fairing 10 which is provided with duct 7 having flanges 21 and reinforcing panel 20 and 22 whereby fairing 10 is rendered a substantially rigid unit, second; is latch and pivot unit 40 which secured to fairing 10 by means of latch mounts 27 and pivot mounts 24 as described above, and third; is bumper unit 41 which is secured to bumper mounts 12.

In practice, the latch and pivot unit 40 is secured to fairing 10 and alignment and adjustments of the pivot mechanisms and the latching mechanisms are made. Bumper unit 41 is secured to bumper mounts 12 before fairing 10 is joined to truck 1. The process permits convenient access to the assemblies and adjustments so as to render the assembly of the fairing and the fairing mount with a truck in a practical and convenient way. The provision of the axle and latch in a single assembly which remains aligned while the positioning of the fairing 10 relative to the cab 2 is being accomplished is novel and of great utility.

Figure 9:
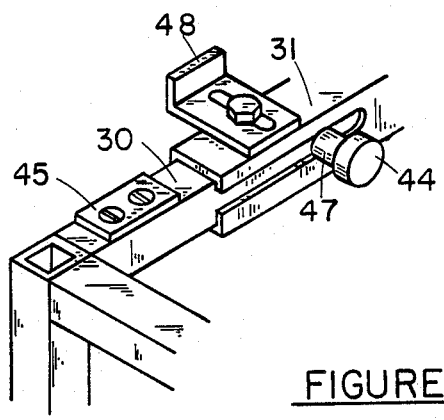
FIG. 9 is a pictorial view showing elements of a preferred latch pin, guide and snubber arrangement.
Figure 10:
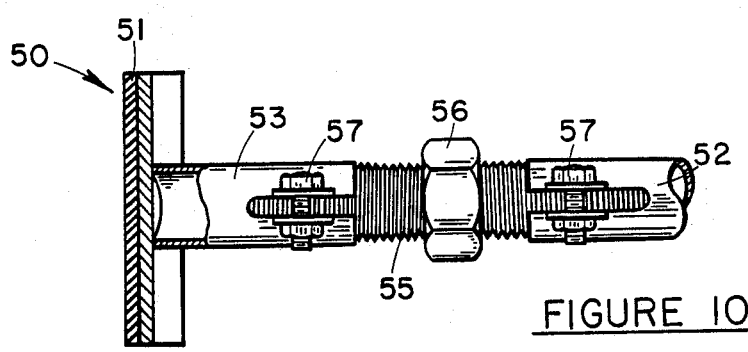
FIG. 10 is a partially sectioned elevational view of a threaded adjustment means for the mount.

While the above disclosure is generally enabling, the best mode known at this time to the inventor, for practicing the invention involves additional elements and variants as disclosed in FIGS. 8, 9, and 10.

In FIG. 8, fairing 10 is shown tilted forward into tilt position 3. Cable 42 serves to hold fairing 10 in position 3 while helper spring 43 serves to aid in the lowering and raising of fairing 10.

In FIG. 9 movable slide member 30 and fixed slide member 31 are shown as rectangular. Latch pin 44 is a part of movable slide member 30. Snubber 45 serves as a cushion between pivot unit 40 and latch assembly 38. Snubber 45 tends to put upward pressure on latch hook 46. To facilitate the release of latch hook 46, latch pin 44 may be provided with sleeve roller 47. Seating guide 48 may serve to index latch mount 27 in position when latch hook 46 is engaged with latch pin 44.

Referring now to FIGS. 5 and 10. Fairing stops 50 serve to support the lower outside corners of fairing 10. Fairing stops 50 are provided with fairing snubbers 51 of rubber or synthetic material. Fairing stop 50 will serve to illustrate an alternate preferred adjustment means or most assemblies wherein coaxial fixed members and movable members are to be adjusted relative to each other. Fixed member 52 and movable member 53 are tubular and are provided with opposite hand threads. Adjustment shaft 55 is in a like manner provided with opposite hand threads to each side of integral wrench securement 56. The positional relationship between movable member 53 and fixed member 52 may be changed by rotating adjustment shaft 55. The relationship between movable member 53 and fixed member 52 may be rendered fixed by tightening clamping units 57.

Figure 11:
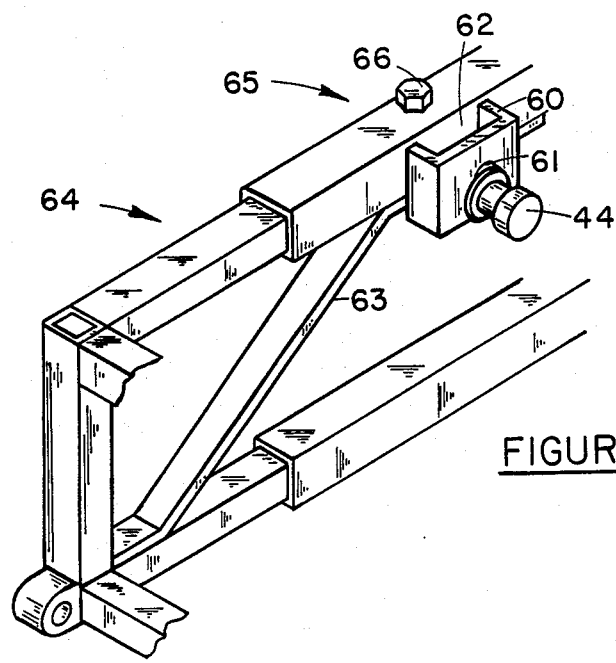
FIG. 11 is a pictorial view of a latch pin adjustment means for the mount.

Referring now to FIG. 11. The latching of latch hook 46 to latch pin 44 is critical to maintaining fairing 10 securely fastened It is within the scope of this invention to provide pin mount 60 for pin 44. Pin 44 is vertically adjustable in slot 61 both for initial alignments and for adjusting for wear. Pin 44 may be locked in place by means of a jam nut and a lock washer (not shown) which are accessible by way of channel 62 in pin mount 60. Pin mount 60 is carried on angle brace 63 of movable member 64. Movable member 64 may be rendered fixed relative to fixed member 65 by drilling a hole through fixed member 65 and movable member 64 and angle brace 63 and passing a bolt 66 through the holes.

The above disclosure is enabling and teaches the best mode of practicing the invention. However, numerous variants of elements and combinations of the elements of this invention can be had without departing from the scope of the invention. To present these variants and combinations would greatly multiply the drawings and cause the specifications to become prolix.

Therefore it should be clearly understood that the scope of this invention should be limited only by the scope of the appended claims and all equivalents thereto that would become apparent to one skilled in the art.

I claim:

1. A truck wind fairing and mount comprising:
   (a) a fairing having an inside and an outside,
   (b) a mount having,
      (1) a latch assembly secured to the inside of the fairing, and having as a part thereof, a latch means,
      (2) a latch engaging and pivot unit secured to the inside of the fairing and below the latch assembly, and the latch engaging and pivot unit has as a part thereof a latch engaging means which is engageable with the latch means of the latch assembly, and the latch engaging and pivot unit is provided with movable members for mounting the fairing to the front of a truck, and
      (3) a bumper unit which is secureable to front bumper mounts of a truck, and the bumper unit is provided with fixed members which are matingly engageable with said movable members which are a part of the latch engaging and pivot unit.

2. The wind fairing of claim 1 wherein the fixed members of the bumper unit are elongate members, having longitudinal axes that project parallel to each other and parallel to a longitudinal axis of a truck and the movable members of the latch engaging and pivot unit are engageable with the fixed members of the bumper unit.

3. The wind fairing and mount of claim 2 wherein the positioning of the fairing relative to the truck is adjustable by adjusting elements of the mount.

4. A tiltable wind fairing and mount for the front of blunt fronted trucks comprising;
   (a) a wind fairing having as a part of its construction, upper latch mounts,
   (b) a latch assembly secured to the latch mounts, and the latch assembly has as a part thereof at least one latch hook,
   (c) lower pivot mounts, forming a part of the fairing construction and positioned below the upper latch mounts,
   (d) a latch engaging and pivot unit, secured to the pivot mounts, and having as a part thereof at least one latch hook engaging pin, and
   (e) the latch engaging and pivot unit is operably secureable to the front of a blunt fronted truck.

5. The wind fairing and mount of claim 4 wherein the fairing and mount are provided with a bumper unit which is secureable to bumper mounts on the front of a truck and the bumper unit has projecting forwardly, relative to the truck, four parallel elongate fixed members having longitudinal axes, and the axes are arranged so that the fixed members are in a rectangular configuration with the longitudinal axes of each fixed member parallel to the longitudinal center line of the truck, and the latch engaging and pivot unit is provided with elongate movable members having longitudinal axes and the movable members are arranged in a rectangular configuration so as to be positionable so that each of the movable members has its longitudinal axis coincident with the longitudinal axis of a fixed member of the bumper unit and the fixed members and the movable members are joined with each other so that the movable members are movable relative to the fixed members along their common axes.

6. The fairing and mount of claim 5 wherein the latch engaging and pivot unit has as a part thereof an axle and the axle has pivot mounts rotatably mounted thereon and the pivot mounts are secured to the fairing by means of bolts, and when the wind fairing and mount are mounted on a truck the axle is horizontal and transverse to a longitudinal axis of the truck.

7. The fairing and mount of claim 6 wherein the latch assembly is secured to the fairing and said latch hook is latchably engageable with said latch pin and the latch engaging and pivot unit is secured to the fairing by bolts.

8. The wind fairing and mount of claim 5 wherein the fixed members of the bumper unit and the movable members of the latch engaging and pivot unit are telescoping tubular members.

9. The wind fairing and mount of claim 4 wherein the wind fairing is provided with a duct for guiding air to a radiator grill of the truck and wherein the fairing and mount are provided with a bottom wind deflector which guides air flow under the fairing and mount.

10. The wind fairing and mount of claim 4 wherein the wind fairing and mount is provided with means for positionally adjusting the wind fairing relative to the truck along a longitudinal axis, a transverse axis and a vertical axis.

11. The wind fairing and mount of claim 4 wherein said pin is provided with a means for adjusting the positioning of said pin relative to said latch engaging and pivot unit.

12. The wind fairing and mount of claim 4 wherein said wind fairing and mount is provided with a retainer cable which serves to support the fairing when it is in a tilt position and said wind fairing and mount is further provided with a helper spring which aids in raising and lowering of the fairing.

13. The wind fairing and mouth of claim 4 wherein said wind fairing and mount is provided with fairing stops which serve to support lower outside corners of the fairing and said stops are provided with fairing snubbers of resilient material.

* * * * *